(12) United States Patent
Fukaya

(10) Patent No.: US 8,403,426 B2
(45) Date of Patent: Mar. 26, 2013

(54) AUTOMOBILE WHEEL

(75) Inventor: Noriyuki Fukaya, Anjo (JP)

(73) Assignee: Central Motor Wheel Co., Ltd., Aichi (JP)

( * ) Notice: Subject to any disclaimer, the term of this patent is extended or adjusted under 35 U.S.C. 154(b) by 148 days.

(21) Appl. No.: 12/615,719

(22) Filed: Nov. 10, 2009

(65) Prior Publication Data

US 2010/0117444 A1  May 13, 2010

(30) Foreign Application Priority Data

Nov. 11, 2008  (JP) ................................ 2008-288322

(51) Int. Cl.
*B60B 3/10* (2006.01)
(52) U.S. Cl. ............................. 301/63.105; 301/63.103
(58) Field of Classification Search ............. 301/63.101, 301/63.103, 63.104, 63.105, 63.106, 64.5, 301/95.101; 29/894.323
See application file for complete search history.

(56) References Cited

U.S. PATENT DOCUMENTS

| | | | | |
|---|---|---|---|---|
| 1,564,738 A | * | 12/1925 | Williams | 301/63.104 |
| 5,257,455 A | * | 11/1993 | Iwatsuki | 29/894.323 |
| 5,772,288 A | * | 6/1998 | Cvijanovic | 301/63.105 |
| 5,988,763 A | * | 11/1999 | Wei | 301/63.103 |
| 6,769,743 B1 | * | 8/2004 | Aasen et al. | 301/63.104 |
| 2009/0212620 A1 | * | 8/2009 | Coleman et al. | 301/63.104 |

FOREIGN PATENT DOCUMENTS

| | | | |
|---|---|---|---|
| FR | 2588511 A1 | * | 4/1987 |
| JP | 09002003 A | | 1/1997 |
| WO | WO 2008/010835 | * | 1/2008 |

* cited by examiner

*Primary Examiner* — Jason Bellinger
(74) *Attorney, Agent, or Firm* — McDermott Will & Emery LLP

(57) ABSTRACT

An automobile wheel includes: a wheel rim 2 including a circumferential positioning fitting groove 32 formed circumferentially around the center axis of the wheel rim 2 in the front surface of a circumferential bent portion 31 at which a front bead seat portion 13 and a front rim flange portion 11 are formed continuously with each other; and a wheel disc 3 including a circumferential insertion edge 36 formed circumferentially around the center axis of the wheel disc 3 on the back surface of an outer peripheral edge portion 24. The wheel rim 2 and the wheel disc 3 are welded to each other for integration with the circumferential insertion edge 36 fitted in the circumferential positioning fitting groove 32. The respective center axes of the wheel rim 2 and the wheel disc 3 are aligned with each other with high precision, achieving an advantageous effect that vibration that occurs while an automobile is running is suppressed to improve the operation stability and achieve high durability.

3 Claims, 9 Drawing Sheets

Fig. 5
(A)
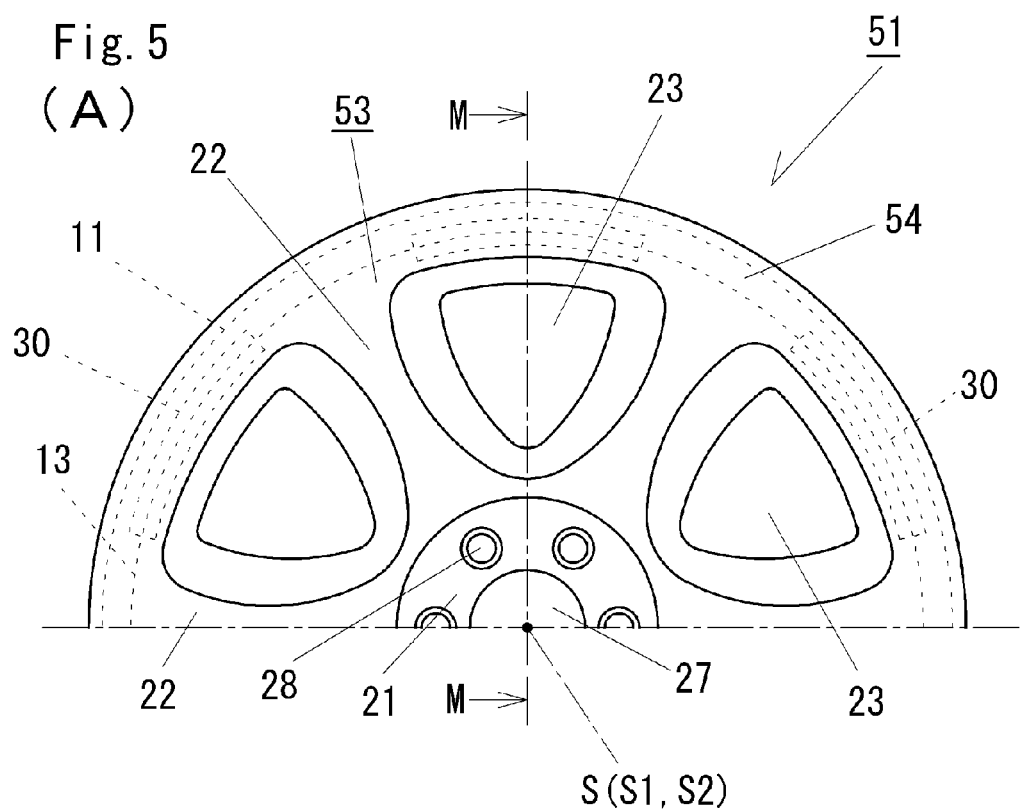
(B)
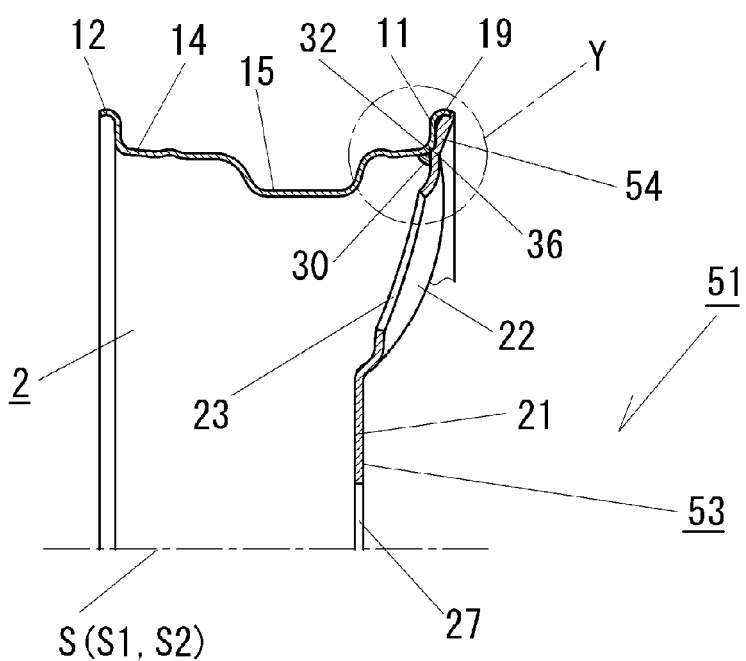

AUTOMOBILE WHEEL

CROSS-REFERENCE TO PRIOR APPLICATIONS

Priority is claimed to Japanese Patent Application No. 2008-288322, filed on Nov. 11, 2008, which is hereby incorporated by reference in its entirety herein.

FIELD OF THE INVENTION

The present invention relates to an automobile wheel in which a wheel rim on which a tire is to be mounted and a wheel disc to which an axle is to be coupled are fitted with and welded to each other for integration.

BACKGROUND

There are so-called two-piece automobile wheels in which a generally cylindrical wheel rim and a generally disc-like wheel disc are welded to each other. Well-known types of the two-piece automobile wheels include drop-fitting automobile wheels in which a wheel disc is fitted inside, and welded to, a drop portion of a wheel rim, and bead-fitting automobile wheels in which a wheel disc is fitted inside, and welded to, a front bead seat portion of a wheel rim. There are also known full-face automobile wheels, an example of which is denoted by h in FIG. 9. In the full-face automobile wheel h, a front flange portion n that supports a front bead of a tire is provided at the outer peripheral edge of a wheel disc m. Also in the full-face automobile wheel h, a wheel rim i includes a front bead seat portion j provided at one opening peripheral edge of the wheel rim i, and a back rim flange portion k provided at the other opening peripheral edge of the wheel rim i. The one opening peripheral edge (at which the front bead seat portion j is provided) of the wheel rim i is abutted with and welded to the back surface of the wheel disc m. The full-face automobile wheel h secures a large design surface on the wheel disc m compared to the drop-fitting automobile wheels and the bead-fitting automobile wheels described earlier, providing an advantage in that the design quality can be improved.

In the case of the full-face automobile wheel described above, however, the one opening peripheral edge of the wheel rim i is abutted with the back surface of the wheel disc m to be welded from outside (to form a welded portion p), and therefore it is difficult to align the respective center axes (not shown) of the wheel rim and the wheel disc m with each other. Therefore, a dedicated device that aligns the respective center axes of wheel rim i and the wheel disc m with each other is required, which increases the number of production processes and hence the production time. In addition, it is necessary to securely weld the opening peripheral edge (at which the front bead seat portion j is formed) of the wheel rim i and the wheel disc m to each other over the entire periphery. This is because if the welding was not properly performed over the entire periphery, air in a tire would disadvantageously leak out when the tire was mounted on the automobile wheel h. Therefore, the welding process for the entire periphery takes a long time and consumes an increased amount of filler metal. These factors generally increase the production cost.

Automobile wheels are also proposed in which an outer peripheral edge portion of a wheel disc is fitted inside, and welded to, a front rim flange portion of a wheel rim (for example, as described in Japanese Unexamined Patent Publication No. Tokkai-Hei 9-2003). This configuration allows securing a large design surface on the wheel disc compared to the drop-fitting automobile wheels and the bead-fitting automobile wheels described above, providing an advantage in that the design quality can be improved. Another advantage is that the wheel rim and the wheel disc can be positioned with respect to each other relatively easily by fitting the outer peripheral edge portion of the wheel disc inside the front rim flange portion of the wheel rim. In addition, it is not necessary to perform welding over the entire periphery as in the full-face automobile wheels.

DISCLOSURE OF THE INVENTION

Problem to be Solved by the Invention

In the two-piece automobile wheels described above, the wheel rim and the wheel disc are radially positioned with respect to each other by fitting the wheel rim and the wheel disc with each other. Thus, the respective center axes of the wheel disc and the wheel rim in the fitting state should be aligned with each other with high precision. As the precision of the alignment between the respective center axes of the wheel rim and the wheel disc increases, the effect to suppress vibration that occurs while the automobile is running because of deviation between the rotation center and the center axes improves. It is desired to reduce the magnitude of such vibration (hereinafter referred to as "amplitude of vibration") that occurs during running as much as possible, because the amplitude of vibration affects the operation stability. Therefore, the wheel rim and the wheel disc should be formed with desired geometry with high precision in order that their respective center axes are aligned with each other with high precision.

In steel automobile wheels, for example, a wheel rim is normally formed by abutting and welding the short sides of a flat rectangular plate with each other to form a cylinder, performing a rolling process in which the cylinder is pressed by dies from both the inner and outer sides of the cylinder, and performing an expansion process to obtain a desired circularity. The dimensional precision of the thus formed wheel rim is limited because it is formed into a "perfect circle" through the rolling process and the subsequent expansion process. The dimensional precision of the wheel disc is also limited because it is normally formed through a pressing process performed on a flat circular plate.

In the configuration described in Japanese Unexamined Patent Publication No. Tokkai-Hei 9-2003, the front rim flange portion of the wheel rim and the outer peripheral edge portion of the wheel disc are fitted with each other. Because the front flange portion is generally formed in a curved shape, the stability of the positioning precision at the time of fitting is limited. In conjunction with the limited dimensional precision described above, the precision of the alignment between the respective center axes of the wheel rim and the wheel disc and the stability of the precision of this configuration tend to be low. Thus, it is desirable to provide an automobile wheel which secures a relatively large design surface as in the configuration described in Japanese Unexamined Patent Publication No. Tokkai-Hei 9-2003 and in which the respective center axes of a wheel rim and a wheel disc are aligned with each other with higher precision in order to reduce the vibration amplitude of the automobile wheel during rotation as much as possible.

The present invention proposes an automobile wheel which has a high design quality and which reduces the vibration amplitude during rotation as much as possible with the respective center axes of a wheel rim and a wheel disc aligned with each other with high precision.

SUMMARY OF THE INVENTION

The present invention provides an automobile wheel including: a wheel rim including front and back bead seat portions that each support a bead of a tire and front and back rim flange portions each formed continuously with a corresponding one of the front and back bead seat portions so as to be bent radially outwardly; and a wheel disc including a hub mounting portion to be coupled to an axle, the wheel disc and the wheel rim being welded to each other. The wheel rim includes a circumferential positioning fitting groove that is formed circumferentially around a center axis of the wheel rim in a front surface of a circumferential bent portion at which the front bead seat portion and the front rim flange portion are formed continuously with each other. The wheel disc includes: a flat annular outer peripheral edge portion; and a circumferential insertion edge that is formed circumferentially around a center axis of the wheel disc on a back surface of the outer peripheral edge portion, the circumferential insertion edge being fitted in the circumferential positioning fitting groove from a front side. The circumferential positioning fitting groove of the wheel rim and the circumferential insertion edge of the wheel disc are welded to each other from a back side with the circumferential positioning fitting groove and the circumferential insertion edge fitted with each other.

The circumferential positioning fitting groove of the wheel rim and the circumferential insertion edge of the wheel disc are formed around the respective center axes of the wheel rim and the wheel disc, and preferably formed specifically through a cutting process, a pressing process using dies, or the like. The circumferential positioning fitting groove is preferably formed by first forming a wheel rim with desired geometry through a rolling process and an expansion process and then performing a cutting process as post-processing, allowing formation with higher precision. Likewise, the circumferential insertion edge is preferably formed by first forming a wheel disc with desired geometry through a pressing process and then performing a cutting process as post-processing, allowing formation with higher precision.

In such a configuration, the circumferential insertion edge formed circumferentially around the center axis of the wheel disc is fitted in the circumferential positioning fitting groove formed circumferentially around the center axis of the wheel rim. Thus, the respective center axes of the wheel rim and the wheel disc are aligned with each other with high precision. This reduces the amplitude of vibration of the automobile wheel configured in accordance with the present invention with respect to the axis of an axle that occurs while an automobile is running as much as possible, generally improving the operation stability.

In the case of conventional two-piece automobile wheels made of a steel or the like, the dimensional precision of the wheel rim is limited because it is formed from a flat rectangular plate through a rolling process and an expansion process as discussed above. For example, if the thickness of the wheel rim is uneven in the circumferential direction, the dimensional precision of the wheel rim with respect to its center axis may be low. In contrast, the wheel rim configured in accordance with the present invention includes the circumferential positioning fitting groove formed around the center axis of the wheel rim. The circumferential positioning fitting groove is formed with high precision with reference to the center axis of the wheel rim. Likewise, the wheel disc includes the circumferential insertion edge formed around the center axis of the wheel disc. By fitting the circumferential insertion edge in the circumferential positioning fitting groove of the wheel rim, the respective center axes of the wheel rim and the wheel disc are aligned with each other with high precision as described above.

The circumferential positioning fitting groove of the wheel rim is formed in the circumferential bent portion at which the front bead seat portion and the front rim flange portion are formed continuously with each other. The circumferential insertion edge of the wheel disc is formed on the back surface of the outer peripheral edge portion. Thus, the outer peripheral edge portion of the wheel disc projects radially outwardly of the circumferential bent portion and is exposed to the front side with the wheel rim and the wheel disc fitted with each other. This allows the automobile wheel configured in accordance with the present invention to secure a wide design surface compared to the drop-fitting automobile wheels and the bead-fitting automobile wheels discussed above, achieving a high design quality.

In the configuration according to the present invention, as discussed above, the wheel rim and the wheel disc are positioned with respect to each other by fitting the circumferential positioning fitting groove of the wheel rim and the circumferential insertion edge of the wheel disc with each other. The wheel rim and the wheel disc may be positioned only by fitting the circumferential positioning fitting groove and the circumferential insertion edge with each other, or the wheel rim and the wheel disc may include respective constituent components that are to be fitted with each other for positioning beside the circumferential positioning fitting groove and the circumferential insertion edge. In the latter configuration, it is preferable that the wheel rim and the wheel disc are substantially positioned with respect to each other by fitting the circumferential positioning fitting groove and the circumferential insertion edge with each other.

In the configuration according to the present invention, the circumferential positioning fitting groove and the circumferential insertion edge may be welded to each other over the entire periphery or at a plurality of points at predetermined intervals.

In the automobile wheel discussed above, the circumferential positioning fitting groove of the wheel rim may be formed by a circumferential stepped fitting edge that includes a fitting wall surface formed circumferentially around the center axis of the wheel rim to extend backwardly from a front side of the wheel rim; and the circumferential insertion edge of the wheel disc may be formed by a circumferential stepped insertion edge that includes an insertion wall surface formed circumferentially around the center axis of the wheel disc to extend forwardly from a back surface of the wheel disc, the insertion wall surface being fitted in the fitting wall surface.

In such a configuration, the circumferential stepped insertion edge of the wheel disc is inserted in the circumferential stepped fitting edge of the wheel rim from the front side to fit the insertion wall surface of the circumferential stepped insertion edge inside the fitting wall surface of the circumferential stepped fitting edge, allowing the wheel rim and the wheel disc to be fitted with each other with their center axes aligned with each other with further higher precision. This is due to the fact that the wheel rim and the wheel disc are positioned with respect to each other by fitting the fitting wall surface, which is formed circumferentially around the center axis of the wheel rim to extend in the front-back direction, and the insertion wall surface, which is formed circumferentially around the center axis of the wheel disc to extend in the front-back direction, with each other. The thus configured fitting wall surface and insertion wall surface in the fitting state do not become misaligned with each other in the radial direction, achieving an advantageous effect that the fitting state between the wheel rim and the wheel disc is retained.

The fitting wall surface and the insertion wall surface are preferably configured to be substantially in parallel to the respective center axes of the wheel rim and the wheel disc. Being substantially in parallel is meant to include not only being in parallel to the respective center axes but also being slightly inclined with respect to the respective center axes and becoming in parallel thereto as a result of deformation due to the fitting. The fitting wall surface and the insertion wall surface are preferably in surface contact with each other when they are in the fitting state.

In the automobile wheel discussed above, the front rim flange portion of the wheel rim may include a circumferential rising portion that extends radially outwardly from the front bead seat portion and a circumferential curved portion curved forwardly from the circumferential rising portion; and the outer peripheral edge portion of the wheel disc may be formed to extend such that an outer peripheral end of the outer peripheral edge portion contacts, or lies in proximity to, an inner peripheral surface of the circumferential curved portion of the front rim flange portion of the wheel rim with the wheel disc and the wheel rim fitted with each other.

In such a configuration, the outer peripheral edge portion of the wheel disc is configured to be relatively wide in the radial direction so as to reach the inner peripheral surface of the circumferential curved portion which forms the front rim flange portion of the wheel rim. This allows securing a further wider design surface, achieving a further higher design quality. The configuration according to the present invention can achieve a design quality of approximately the same level as that achieved by the full-face automobile wheels discussed above.

In the configuration in which the outer peripheral edge portion of the wheel disc is formed such that the outer peripheral end of the outer peripheral edge portion lies in proximity to the inner peripheral surface of the circumferential curved portion which forms the front rim flange portion of the wheel rim, the outer peripheral edge portion and the circumferential curved portion do not contact each other. This allows the wheel rim and the wheel disc to be easily fitted with each other. In this case, the wheel rim and the wheel disc are positioned with respect to each other only by the fitting between the circumferential positioning fitting groove (circumferential stepped fitting edge) and the circumferential insertion edge (circumferential stepped insertion edge). Meanwhile, in the configuration in which the outer peripheral end of the outer peripheral edge portion contacts the inner peripheral surface of the circumferential curved portion of the front rim flange portion, the wheel rim and the wheel disc are fitted with each other by the fitting between the circumferential positioning fitting groove (circumferential stepped fitting edge) and the circumferential insertion edge (circumferential stepped insertion edge) and by the fitting between the outer peripheral edge portion and the front rim flange portion. This improves the strength for maintaining the fitting state, generally improving the durability of the automobile wheel.

In the automobile wheel discussed above, the front rim flange portion of the wheel rim may include a circumferential rising portion that extends radially outwardly from the front bead seat portion and a circumferential curved portion that is curved forwardly from the circumferential rising portion; and the outer peripheral edge portion of the wheel disc may include, at its outer peripheral end, an outer peripheral covering end portion that covers a peripheral end of the circumferential curved portion of the front rim flange portion of the wheel rim from a front side with the wheel disc and the wheel rim fitted with each other.

In such a configuration, the outer peripheral edge portion of the wheel disc is disposed to cover the front rim flange portion of the wheel rim from the front side, achieving a design quality of the same level as that achieved by the full-face automobile wheels discussed above or higher. That is, in the configuration according to the present invention, as discussed above, the wheel rim and the wheel disc are relatively easily integrated with each other with their center axes aligned with each other with high precision, achieving a high design quality.

Effect of the Invention

In the automobile wheel according to the present invention, the wheel rim includes a circumferential positioning fitting groove that is formed circumferentially around the center axis of the wheel rim in the front surface of a circumferential bent portion at which the front bead seat portion and the front rim flange portion are formed continuously with each other, the wheel disc includes a circumferential insertion edge that is formed circumferentially around the center axis of the wheel disc on the back surface of a flat annular outer peripheral edge portion, and the circumferential insertion edge is fitted inside and welded to the circumferential positioning fitting groove for integration. Therefore, the respective center axes of the wheel rim and the wheel disc are aligned with each other with high precision, achieving an advantageous effect that vibration that occurs while an automobile is running is suppressed to improve the operation stability and achieve high durability. The outer peripheral edge portion of the wheel disc is disposed to be exposed to the front side at a position radially outwardly of the circumferential bent portion. This allows securing a wide design surface compared to the drop-fitting automobile wheels and the bead-fitting automobile wheels described above, achieving a high design quality. Thus, it is possible to both improve the operation stability with the respective center axes of the wheel rim and the wheel disc discussed above aligned with each other with high precision and achieve a high design quality.

In the automobile wheel discussed above, the circumferential stepped fitting edge which forms the circumferential positioning fitting groove of the wheel rim may include a fitting wall surface formed circumferentially around the center axis of the wheel rim to extend backwardly from the front side; and the circumferential stepped insertion edge which forms the circumferential insertion edge of the wheel disc may include an insertion wall surface formed circumferentially around the center axis of the wheel disc to extend forwardly from the back surface. In this case, the respective center axes of the wheel rim and the wheel disc are aligned with each other with further higher precision by fitting the fitting wall surface and the insertion wall surface with each other. Thus, it is possible to achieve the effect of the present invention discussed above further properly.

In the automobile wheel discussed above, the outer peripheral end of the outer peripheral edge portion of the wheel disc may be formed to extend so as to contact, or lie in proximity to, the inner peripheral surface of the circumferential curved portion of the front rim flange portion of the wheel rim with the wheel disc and the wheel rim fitted with each other. In this case, the outer peripheral edge portion is configured to be relatively wide in the radial direction, securing an accordingly wide design surface. Thus, it is possible to achieve a design quality of approximately the same level as that achieved by the full-face automobile wheels described above.

In the automobile wheel discussed above, the outer peripheral edge portion of the wheel disc may include, at its outer peripheral end, an outer peripheral covering end portion that covers the peripheral end of the circumferential curved portion of the front rim flange portion of the wheel rim from the front side with the wheel disc and the wheel rim fitted with each other. In this case, the wheel disc prevents the wheel rim from being seen from the front side. Thus, it is possible to achieve a design quality of the same level as that achieved by the full-face automobile wheels described above or higher.

BRIEF DESCRIPTION OF THE DRAWINGS

First and second embodiments of the present invention will be described in detail below with reference to the accompanying drawings in which:

FIG. 5 shows an automobile wheel according to a second embodiment, in which FIGS. 5A and 5B are a partial plan view and a cross-sectional view taken along the line M-M of FIG. 5A, respectively;

DETAILED DESCRIPTION

First Embodiment

Figure 1:
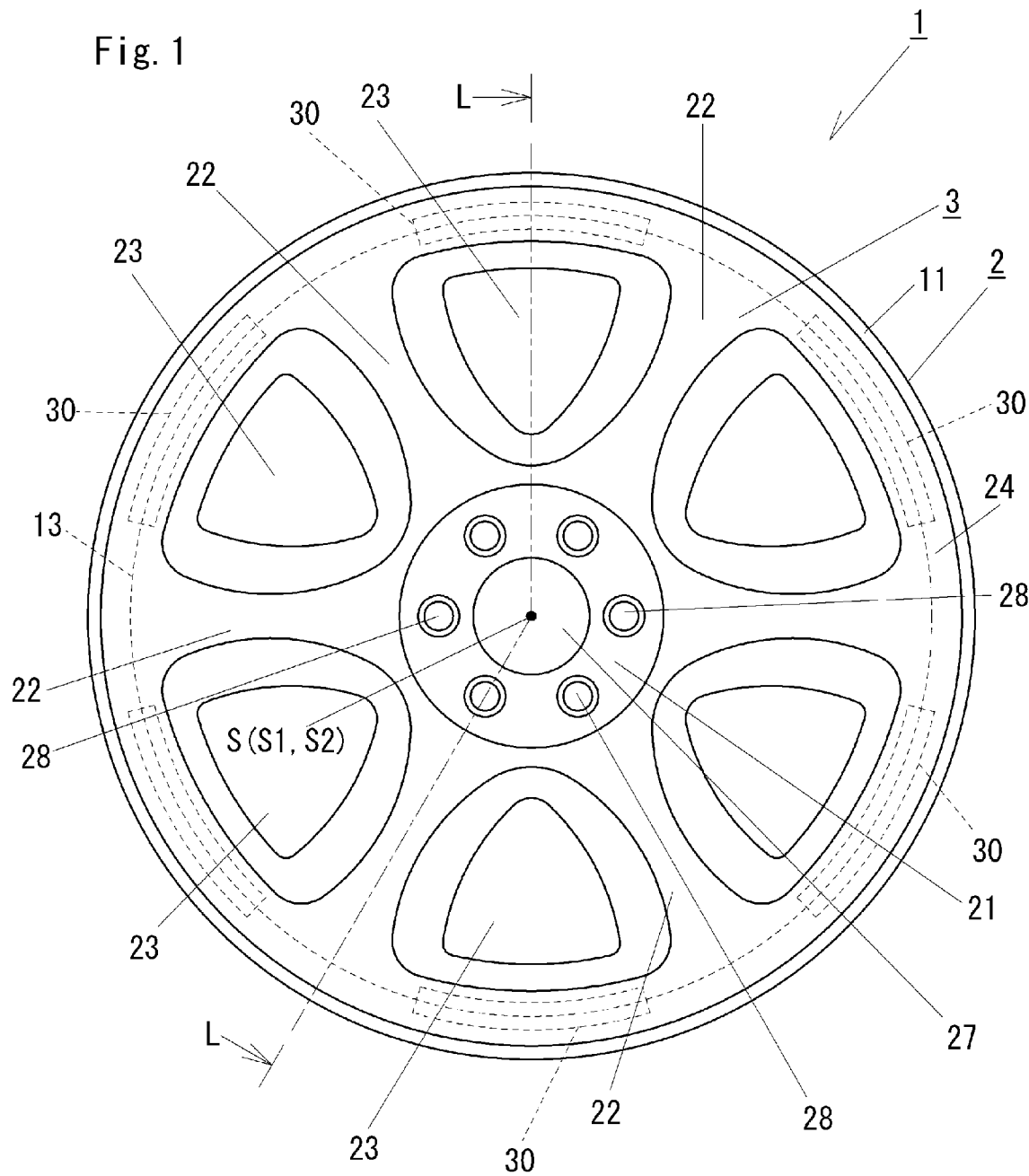
FIG. 1 is a plan view of an automobile wheel according to a first embodiment of the present invention.
Figure 2:
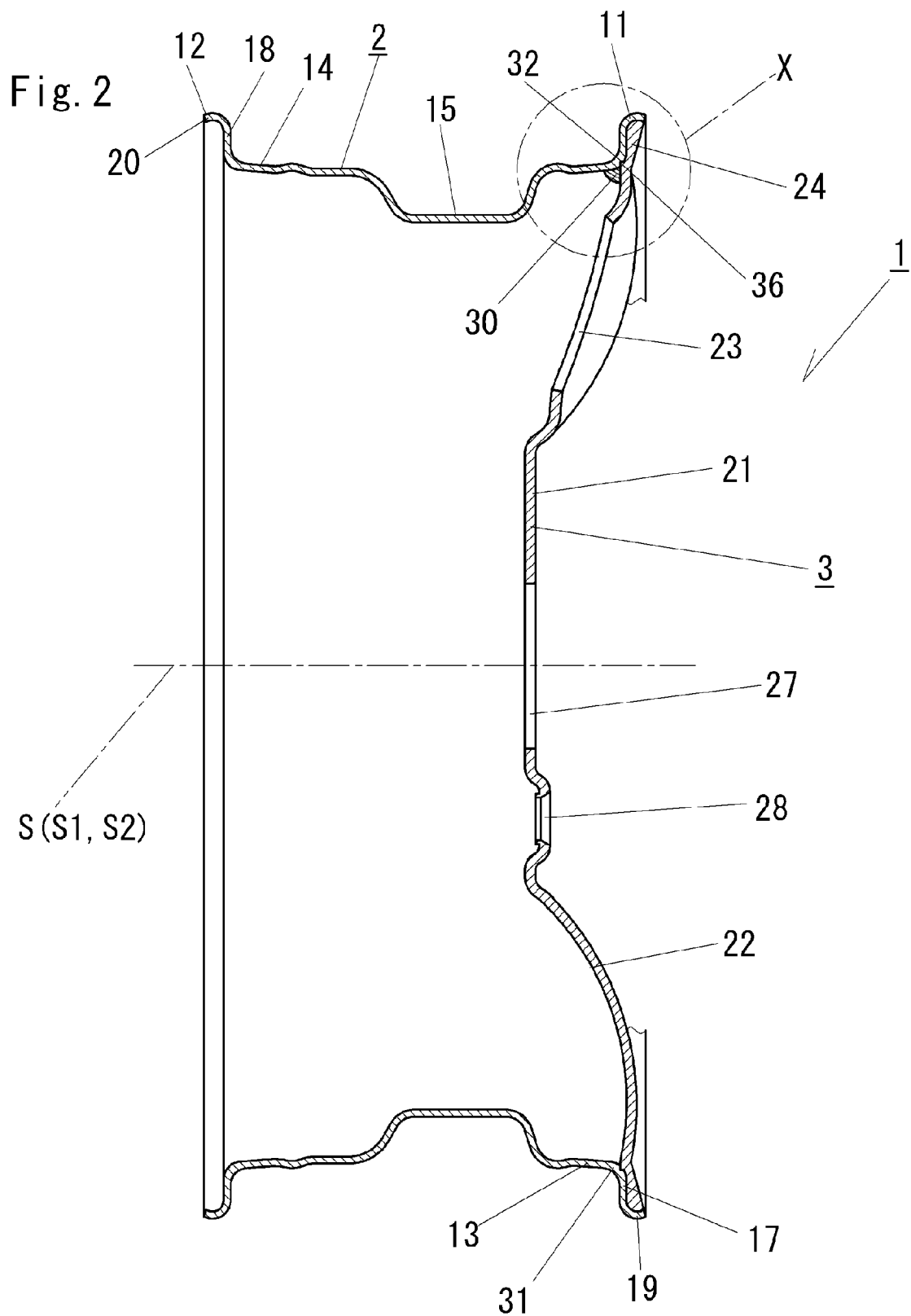
FIG. 2 is a cross-sectional view of the automobile wheel taken along the line L-L of FIG. 1.

FIG. 1 is a plan view of an automobile wheel 1 according to a first embodiment of the present invention. FIG. 2 is a vertical cross-sectional view of the automobile wheel 1. The automobile wheel 1 is a so-called two-piece steel wheel formed by joining a wheel rim 2 and a wheel disc 3 formed from a steel plate. In the embodiment shown in FIGS. 1 and 2, the direction from the back surface of the wheel disc 3 toward the design surface is referred to as "forward direction", and the opposite direction is referred to as "backward direction". Also, the direction toward the center axis S of the automobile wheel 1 along the radial direction of the wheel is referred to as "radially inward direction", and the opposite direction is referred to as "radially outward direction".

The wheel rim 2 mentioned above is generally in the shape of a cylinder, and is provided with front and back rim flange portions 11 and 12 that support front and back beads, respectively, of a tire at both opening edges of the wheel rim 2, and front and back bead seat portions 13 and 14 which are respectively formed continuously with the rim flange portions 11 and 12 and on which the front and back beads of the tire are seated for support and fixation. The wheel rim 2 is further provided with a drop portion 15 between the front and back bead seat portions 13 and 14 into which the front and back beads of the tire are dropped to mount the tire.

Figure 3:
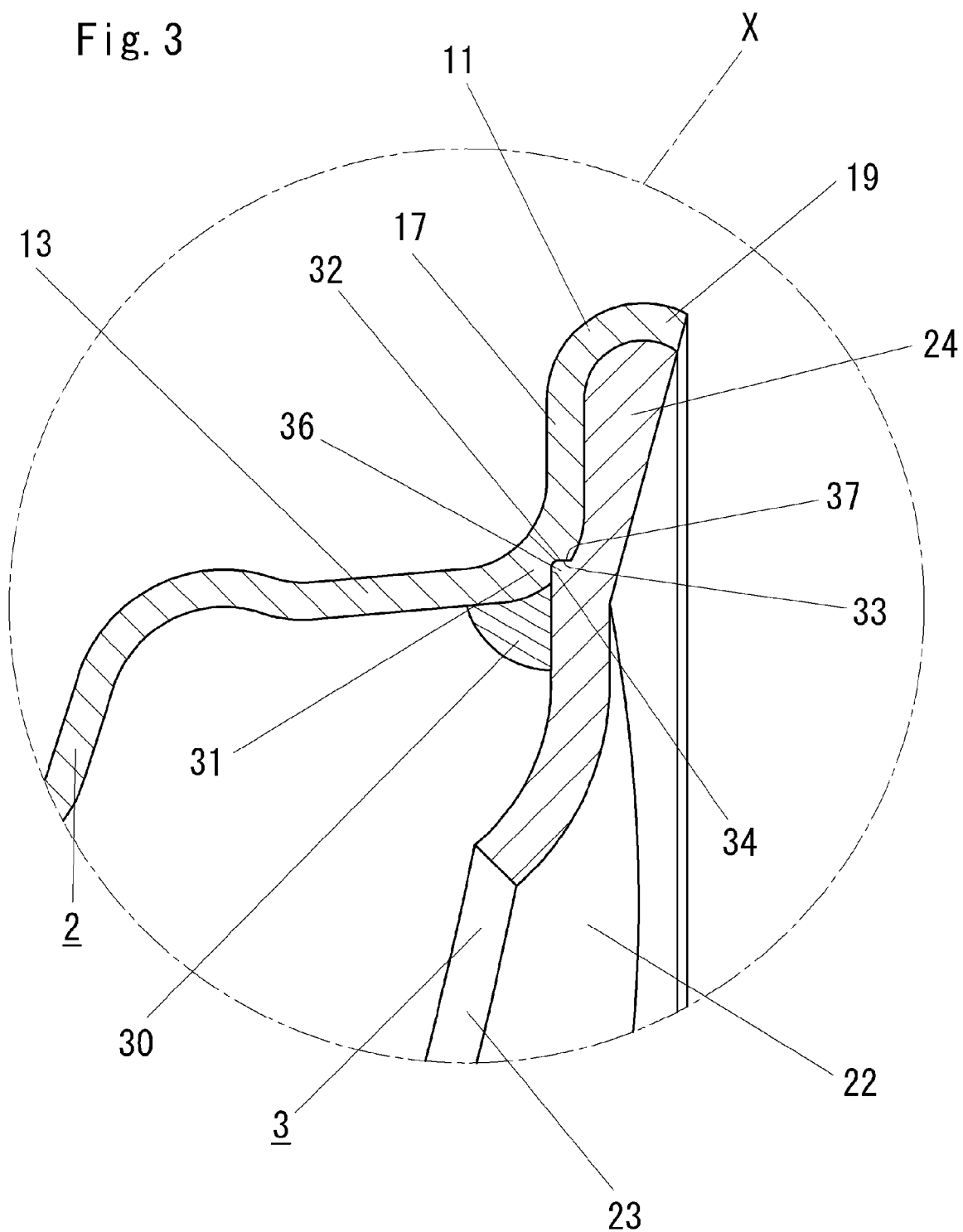
FIG. 3 is an enlarged view of the part X shown in FIG. 2.
Figure 4:
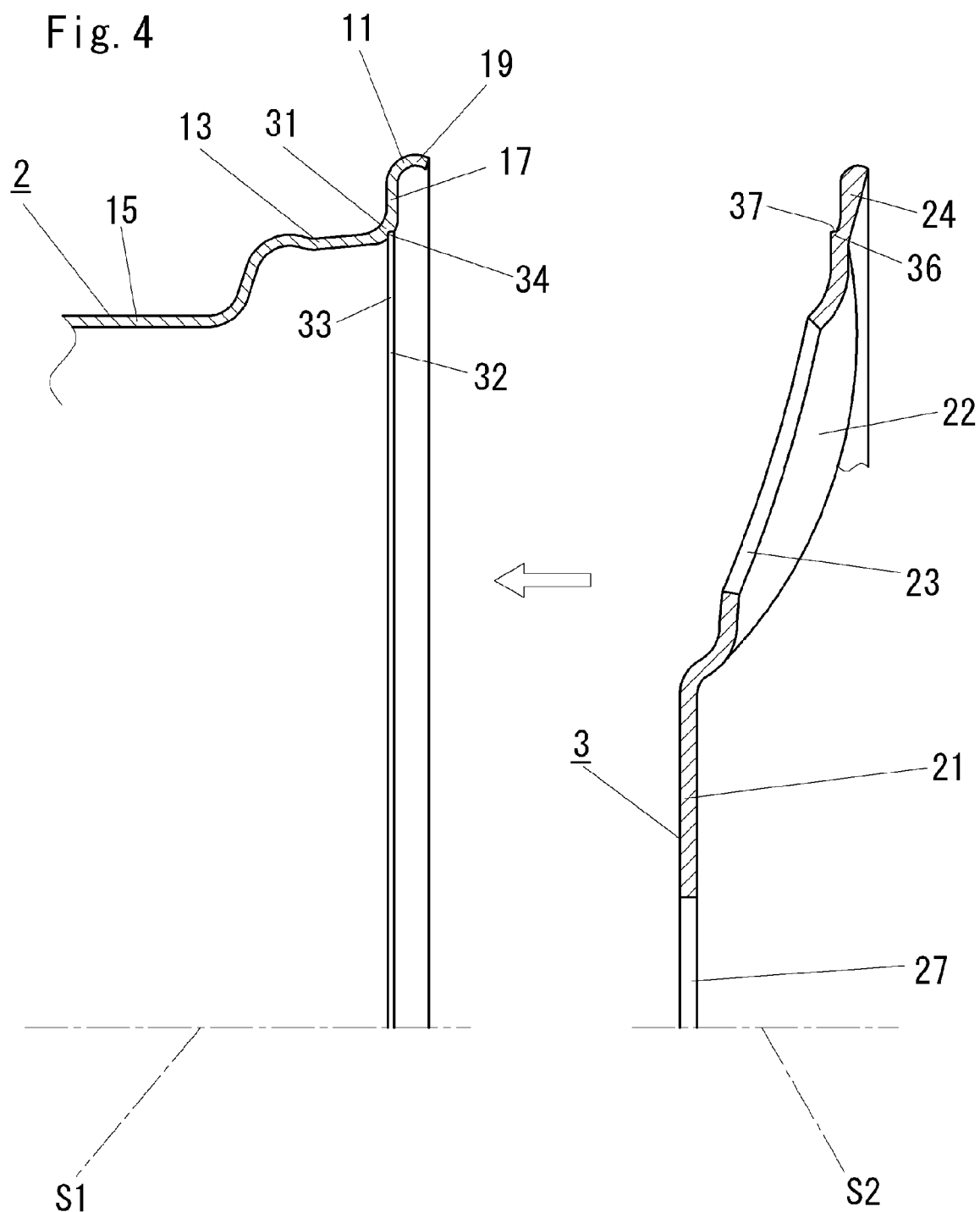
FIG. 4 is an exploded cross-sectional view of a wheel rim 2 and a wheel disc 3.

The front and back rim flange portions 11 and 12 are of the same form in the first embodiment, and respectively include front and back circumferential rising portions 17 and 18 that are formed continuously with the front and back bead seat portions 13 and 14 to extend radially outwardly, and generally curved front and back circumferential curved portions 19 and 20 that extend forwardly or backwardly in a bent manner from the front and back circumferential rising portions 17 and 18 (see FIGS. 2 to 4).

The constituent components of the wheel rim 2 described above are arranged concentrically around a center axis S1 (see FIG. 4) of the wheel rim 2. The wheel rim 2 is formed by abutting and welding the short sides of a flat and generally rectangular steel plate with each other to form a cylinder, performing a rolling process in which the cylinder is pressed by predetermined dies from both the inner and outer sides of the cylinder while it is being rotated, and performing an expansion process to obtain a circularity. The series of formation processes may be performed using conventional formation methods, and therefore are not described herein.

Meanwhile, the wheel disc 3 mentioned above is generally in the shape of a disc, and includes a hub mounting portion 21 located at its center to be coupled to a hub of an axle, and a plurality of spoke portions 22 arranged at equal intervals in the circumferential direction to extend radially outwardly from the peripheral edge of the hub mounting portion 21. An ornamental hole 23 is formed between each pair of the adjacent spoke portions 22. The outer end of each spoke portion 22 is formed continuously with a flat annular outer peripheral edge portion 24. A hub hole 27 is formed in the center of the hub mounting portion 21. A plurality of bolt holes 28 are arranged at equal intervals in the circumferential direction around the hub hole 27 on the radially outer side thereof. The constituent components of the wheel disc 3 are arranged concentrically around a center axis S2 (see FIG. 4) of the wheel disc 3.

Each spoke portion 22 described above is formed to swell forwardly from the peripheral edge of the hub mounting portion 21. In the first embodiment, six spoke portions 22 are arranged at equal intervals in the circumferential direction.

The outer peripheral edge portion 24 mentioned above is formed to be flat and annular to extend radially outwardly of each spoke portion 22. The outermost peripheral end of the outer peripheral edge portion 24 corresponds to the outermost peripheral end of the wheel disc 3. Further, the outer peripheral edge portion 24 is configured to be fitted inside the front rim flange portion 11 with the wheel disc 3 and the wheel rim 2 fitted with each other as will be discussed later. In the configuration according to the first embodiment, the outer peripheral edge portion 24 of the wheel disc 3 is formed to be inclined forwardly such that the outer peripheral end of the outer peripheral edge portion 24 and the peripheral end of the circumferential curved portion 19 of the front rim flange portion 11 are located approximately at the same level as each other. This yields the effect that the design surface appears further wider with the wheel disc 3 and the wheel rim 2 fitted with each other as will be discussed later.

The wheel disc 3 described above may be formed by performing a pressing process on a flat circular steel plate using conventional formation methods. Therefore, the formation processes are not described herein.

In the wheel rim 2 discussed above, as shown in FIG. 4, a circumferential stepped fitting edge 32 is formed circumferentially at the circumferential bent portion 31 in which the front rim flange portion 11 and the front bead seat portion 13 are formed continuously with each other. The circumferential stepped fitting edge 32 is formed around the center axis S1 of the wheel rim 2 over the entire circumference thereof. The circumferential stepped fitting edge 32 includes a fitting wall surface 33 formed circumferentially to extend backwardly from the front side of the circumferential bent portion 31 generally in parallel to the center axis S1, and a stepped bottom 34 extending inwardly from the back end of the fitting wall surface 33. The circumferential stepped fitting edge 32 is formed in a stepped shape by cutting the circumferential bent portion 31 generally in the shape of the letter "L" in cross section. In more detail, the fitting wall surface 33 of the circumferential stepped fitting edge 32 is formed by performing a cutting process around the center axis S1 at a constant distance from the center axis S1 with high precision after the wheel rim 2 is formed through the series of formation processes described above (after the expansion process). The circumferential stepped fitting edge 32 is preferably formed through so-called post-processing as described above. The circumferential stepped fitting edge 32 and the circumferential positioning fitting groove can be used as interchangeable terms according to the present invention.

Meanwhile, in the wheel disc 3 described above, as shown in FIG. 4, a circumferential stepped insertion edge 36 is formed circumferentially on the back surface of the outer peripheral edge portion 24 at a position radially inwardly of the outermost peripheral end thereof. The circumferential stepped insertion edge 36 is formed around the center axis S2 of the wheel disc 3 over the entire circumference thereof. The circumferential stepped insertion edge 36 includes an insertion wall surface 37 formed to extend forwardly from the back surface of the wheel disc 3 generally in parallel to the center axis S2. In more detail, the insertion wall surface 37 of the circumferential stepped insertion edge 36 is formed by performing a cutting process around the center axis S2 at a constant distance from the center axis S2 with high precision after the wheel disc 3 is formed with desired geometry through the formation processes described above (after the pressing process). The circumferential stepped insertion edge 36 is preferably formed through so-called post-processing as described above. The circumferential stepped insertion edge 36 corresponds to the circumferential insertion edge according to the present invention.

The circumferential stepped fitting edge 32 of the wheel rim 2 and the circumferential stepped insertion edge 36 of the wheel disc 3 described above are each configured to have such geometry that allows the wheel disc 3 and the wheel rim 2 to be fitted with each other by fitting the circumferential stepped insertion edge 36 inside the circumferential stepped fitting edge 32. That is, the inside diameter of the fitting wall surface 33 of the circumferential stepped fitting edge 32 and the outside diameter of the insertion wall surface 37 of the circumferential stepped insertion edge 36 are approximately the same as each other so as to allow the fitting wall surface 33 and the insertion wall surface 37 to be fitted with each other (see FIG. 3). This enables the wheel rim 2 and the wheel disc 3 to be retained in the fitting state described above.

By fitting the wheel disc 3 in the wheel rim 2 from the front side thereof, the circumferential stepped insertion edge 36 of the wheel disc 3 is fitted inside the circumferential stepped fitting edge 32 of the wheel rim 2 to fit the wheel rim 2 and the wheel disc 3 with each other as shown in FIGS. 2 and 3. With the fitting wall surface 33 of the circumferential stepped fitting edge 32 and the insertion wall surface 37 of the circumferential stepped insertion edge 36 fitted with each other, the respective center axes S1 and S2 of the wheel rim 2 and the wheel disc 3 are aligned with each other with high precision. That is, the respective center axes S1 and S2 of the wheel rim 2 and the wheel disc 3 are aligned with each other with high precision on the center axis S of the automobile wheel 1. The respective center axes S1 and S2 of the wheel rim 2 and the wheel disc 3 can be aligned with each other with high precision relatively easily by fitting the circumferential stepped fitting edge 32 and the circumferential stepped insertion edge 36 with each other.

In the first embodiment, the outer peripheral edge portion 24 of the wheel disc 3 is configured to be fitted inside the front rim flange portion 11 of the wheel rim 2 with the outer peripheral edge portion 24 fitted with the wheel rim 2 as described above. That is, as shown in FIG. 3, the back surface of the outer peripheral edge portion 24 is seated on the front surface of the circumferential rising portion 17 which forms the front rim flange portion 11, and the outermost peripheral end of the outer peripheral edge portion 24 contacts the inner peripheral surface of the circumferential curved portion 19 which forms the front rim flange portion 11. With the outer peripheral edge portion 24 formed to be fitted inside the front rim flange portion 11 as described above, the design surface (front surface) of the wheel disc 3 can be secured to be wide, achieving a high design quality. With the outer peripheral end of the outer peripheral edge portion 24 and the peripheral end of the circumferential curved portion 19 of the front rim flange portion 11 located at the same level as each other as described above, the design surface appears further wider.

With the outermost peripheral end of the outer peripheral edge portion 24 of the wheel disc 3 contacting the inner peripheral surface of the circumferential curved portion 19 of the front rim flange portion 11, the fitting state between the wheel disc 3 and the wheel rim 2 can be retained with improved reliability. The outer peripheral edge portion 24 and the front rim flange portion 11 are each configured to have such geometry that will not reduce the positioning effect obtained through the fitting between the circumferential stepped fitting edge 32 and the circumferential stepped insertion edge 36 described above. This allows the effect that the center axes S1 and S2 are aligned with each other with high precision to be achieved properly, and allows retention of such an aligned state.

The automobile wheel 1 according to the first embodiment is obtained by fitting the wheel rim 2 and the wheel disc 3 with each other as discussed above and welding them to each other for integration. That is, with the circumferential stepped fitting edge 32 of the wheel rim 2 and the circumferential stepped insertion edge 36 of the wheel disc 3 fitted with each other, the circumferential stepped fitting edge 32 and the circumferential stepped insertion edge 36 are welded to each other through arc welding from the back side at a plurality of points at equal intervals in the circumferential direction to form a plurality of welded portions 30. During the arc welding, the circumferential stepped fitting edge 32 and the circumferential stepped insertion edge 36 are retained in the fitting state, and thus the wheel rim 2 and the wheel disc 3 do not become misaligned with each other. Therefore, the automobile wheel 1 is fabricated with the respective center axes S1 and S2 of the wheel rim 2 and the wheel disc 3 kept aligned with high precision.

The respective center axes S1 and S2 of the wheel rim 2 and the wheel disc 3 are aligned with each other with high precision on the center axis S of the automobile wheel 1 as described above. Therefore, the amplitude of vibration that occurs during rotation of the automobile wheel 1 is sufficiently suppressed, and thus excellent operation stability is achieved while an automobile to which the automobile wheel 1 is mounted is running.

In the automobile wheel 1, as shown in FIG. 1, the wheel disc 3 covers from the design surface side the wheel rim 2 except for the peripheral end of the circumferential curved portion 19 which forms the front rim flange portion 11 of the wheel rim 2. Therefore, the wheel disc 3 secures a wide design surface, providing a wide design surface and an excellent design quality compared to the conventional drop-fitting automobile wheels and bead-fitting automobile wheels discussed above. The design surface of the wheel disc 3 is approximately as large as that of the full-face automobile wheels discussed above.

The wheel disc 3 according to the first embodiment is made of a steel, and is normally formed through a pressing process performed on a steel plate material as described above. After a pressing process in the formation process of the wheel disc 3, a cutting process is performed on the outer peripheral edge of the wheel disc 3 using a lathe or the like so as to form the outer peripheral edge portion 24 of the wheel disc 3 in conformity to the shape of the inner peripheral surface of the front rim flange portion 11. As the cutting process, the outer peripheral edge portion of the wheel disc 3 may be chamfered, for example. Such a cutting process may be performed along with the cutting process for forming the circumferential stepped insertion edge 36 as discussed above.

Second Embodiment

Figure 6:
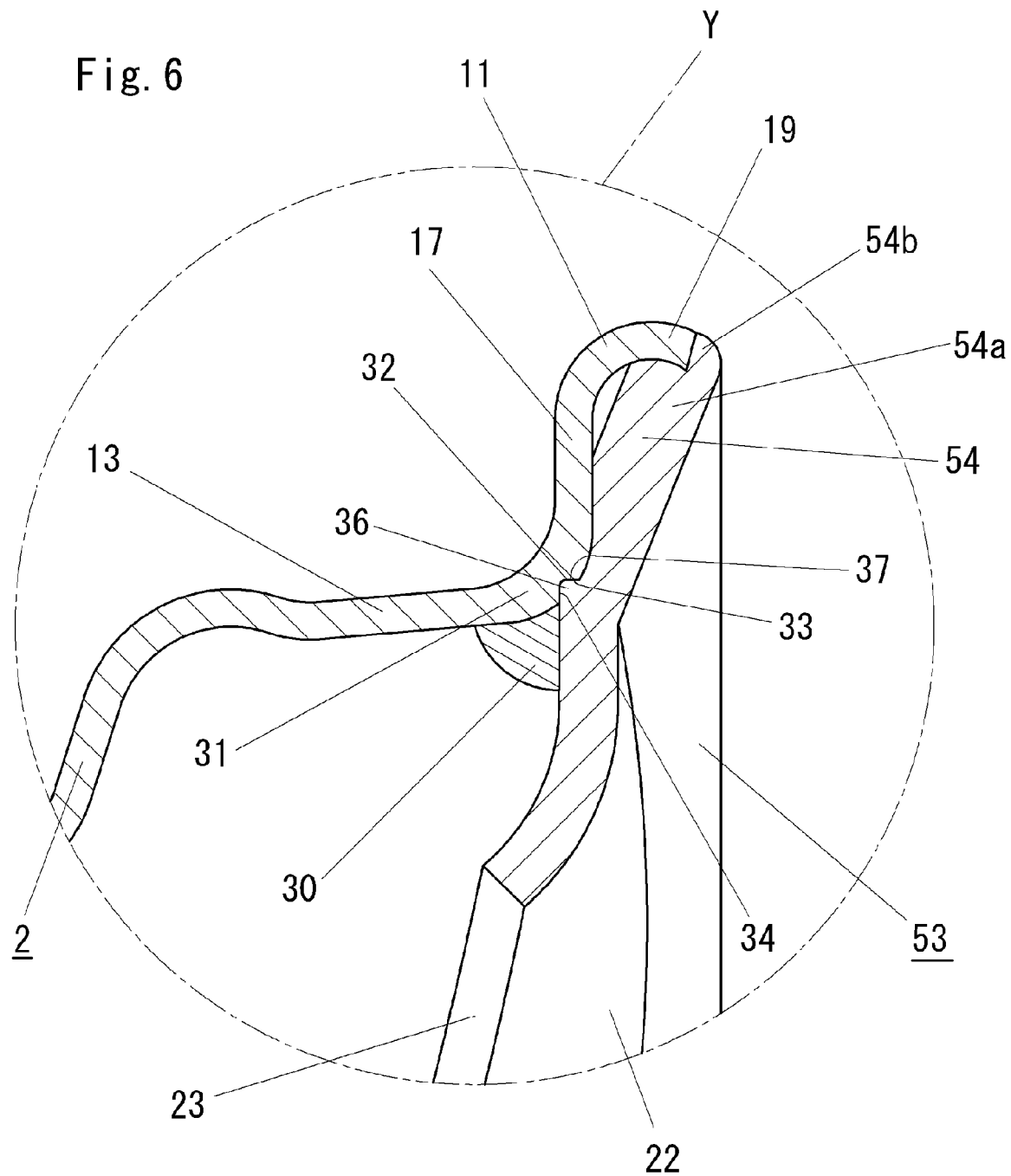
FIG. 6 is an enlarged view of the part Y shown in FIG. 5B.

In an automobile wheel 51 according to a second embodiment, as shown in FIGS. 5 and 6, the front rim flange portion 11 of the wheel rim 2 is covered by an outer peripheral edge portion 54 of a wheel disc 53. The outer peripheral edge portion 54 is formed to be flat, annular, and inclined forwardly, and includes an outer peripheral covering end portion 54b provided at the outer peripheral end of the outer peripheral edge portion 54 to cover the peripheral end of the circumferential curved portion 19 of the front rim flange portion 11 from the front side. In more detail, as shown in FIG. 6, the outer peripheral edge portion 54 includes a main outer edge portion 54a to be fitted inside the front rim flange portion 11, and an annular outer peripheral covering end portion 54b extending radially outwardly from the peripheral end of the main outer edge portion 54a. The outer peripheral covering end portion 54b is formed continuously with the main outer edge portion 54a to smoothly extend radially outwardly therefrom such that the surface of the outer peripheral covering end portion 54b extends along the surface of the main outer edge portion 54a. The outer peripheral covering end portion 54b is thinner than the main outer edge portion 54a, and is formed to extend radially outwardly from the front portion of the main outer edge portion 54a. In the outer peripheral edge portion 54, the main outer edge portion 54a is fitted inside the front rim flange portion 11 with the outer peripheral covering end portion 54b covering the end surface of the circumferential curved portion 19 of the front rim flange portion 11.

Figure 9:
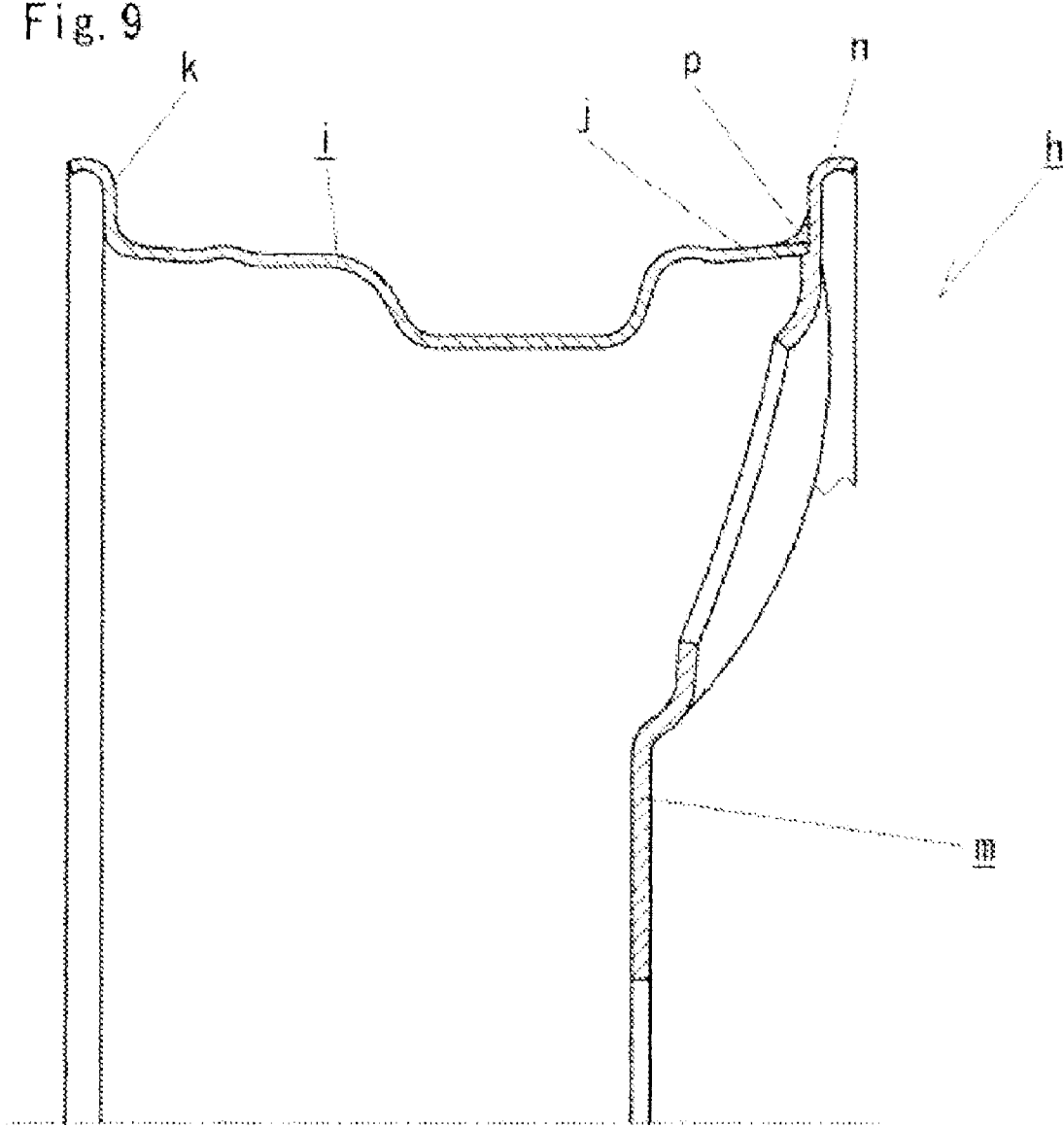
FIG. 9 is an enlarged cross-sectional view of a conventional full-face automobile wheel h.

With the wheel disc 53 and the wheel rim 2 fitted with each other, as shown in FIGS. 5A and 5B, the front rim flange portion 11 of the wheel rim 2 is covered by the outer peripheral edge portion 54 of the wheel disc 53 and thus is not exposed to the front side. The presence of the outer peripheral edge portion 54 of the wheel disc 53 described above allows the automobile wheel 51 according to the second embodiment to secure a further wider design surface than that in the configuration according to the first embodiment described above, providing an excellent design surface compared to the full-face automobile wheels (see FIG. 5A). In more detail, in the conventionally configured full-face automobile wheel h, the front flange portion n formed at the outer peripheral edge of the wheel disc m is curved forwardly as shown in FIG. 9. Therefore, the automobile wheel h is easily recognized at a glance as a product formed through a pressing process and hence as a steel wheel which is relatively inexpensive. In the automobile wheel 51 according to the second embodiment described above, in contrast, the outer peripheral edge portion 54 of the wheel disc 53 includes the outer peripheral covering end portion 54b that is formed to smoothly extend radially outwardly from the main outer edge portion 54a and that covers the front rim flange portion 11 of the wheel rim 2. Thus, the front rim flange portion 11 is not seen from the front side, and the shape of the front rim flange portion 11 is not known from the front side. Therefore, the automobile wheel 51 may be recognized not to have a front flange portion curved forwardly as with automobile wheels which are made of an aluminum alloy (automobile wheels formed through a casting process) and hence are relatively expensive. Thus, the automobile wheel 51 according to the second embodiment can achieve a design quality that is very close to that of automobile wheels made of an aluminum alloy compared to the conventional full-face automobile wheel h (see FIG. 9).

The configuration according to the second embodiment is the same as the configuration according to the first embodiment discussed above except for that the wheel disc 53 includes an outer peripheral edge portion 54 having an outer peripheral covering end portion 54b. Thus, like constituent components are denoted by like reference numerals, and therefore are not described herein. The wheel disc 53 may be obtained through the same formation processes as those in the first embodiment discussed above. Also, the wheel rim 2 is the same as that in the first embodiment.

That is, also in the configuration according to the second embodiment, as in the first embodiment discussed above, the circumferential stepped insertion edge 36, which includes the insertion wall surface 37 formed to extend generally in parallel to the center axis S2, is formed circumferentially on the back surface of the outer peripheral edge portion 54 of the wheel disc 53 at a position radially inwardly of the outermost peripheral end thereof. The wheel disc 53 is fitted with the wheel rim 2 from the front side, and the circumferential stepped insertion edge 36 of the wheel disc 53 is fitted with the circumferential stepped fitting edge 32 of the wheel rim 2. In this fitting state, the circumferential stepped fitting edge 32 and the circumferential stepped insertion edge 36 are welded to each other at a plurality of points at equal intervals in the circumferential direction to integrate the wheel rim 2 and the wheel disc 53 with each other, obtaining the automobile wheel 51 according to the second embodiment. In the automobile wheel 51, the respective center axes S1 and S2 of the wheel rim 2 and the wheel disc 53 are aligned with each other with high precision on the center axis S of the automobile wheel 51 with the circumferential stepped fitting edge 32 and the circumferential stepped insertion edge 36 fitted with each other. Consequently, the effect to suppress the amplitude of vibration that occurs while an automobile is running is improved as in the first embodiment discussed above.

Although the circumferential stepped fitting edge (circumferential positioning fitting groove) of the wheel rim and the circumferential stepped insertion edge (circumferential insertion edge) of the wheel disc are formed through a cutting process in the configurations according to the first and second embodiments discussed above, they may be formed through a pressing process using punches, dies, or the like. The pressing process for forming the circumferential stepped fitting edge and the circumferential stepped insertion edge may be performed as post-processing, allowing high-precision formation with reference the center axis.

In the configuration according to the first embodiment discussed above, the outer peripheral end of the outer peripheral edge portion of the wheel disc contacts the inner peripheral surface of the circumferential curved portion which forms the front rim flange portion of the wheel rim. In an alternative configuration, the outer peripheral end of the outer peripheral edge portion may be located in proximity to the inner peripheral surface of the circumferential curved portion. In this case, the wheel disc and the wheel rim are fitted with each other only by the fitting between the circumferential stepped fitting edge (circumferential positioning fitting groove) and the circumferential stepped insertion edge (circumferential insertion edge), allowing the precision of the alignment between the respective center axes of the wheel disc and the wheel rim to be further stabilized. Meanwhile, also in the second embodiment discussed above, the outer peripheral end of the main outer edge portion which forms the outer peripheral edge portion of the wheel disc may be located in proximity to the inner peripheral surface of the circumferential curved portion of the front rim flange portion.

Figure 7:
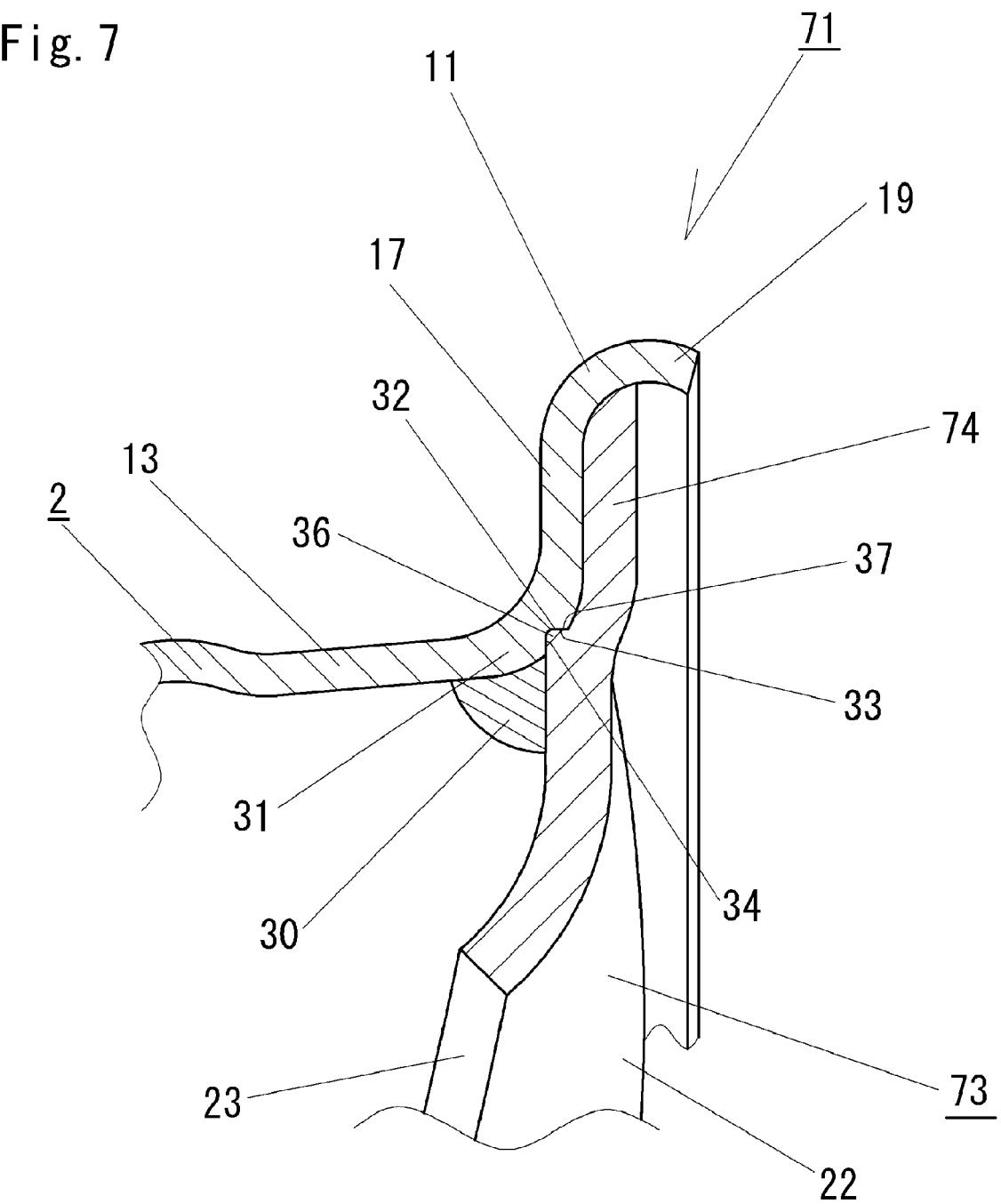
FIG. 7 is an enlarged cross-sectional view of an automobile wheel according to another embodiment, showing the fitting state between a circumferential stepped fitting edge of the wheel rim and a circumferential stepped insertion edge of a wheel disc.

In the configuration according to the first embodiment discussed above, the outer peripheral edge portion of the wheel disc is formed to be inclined forwardly such that the outer peripheral end of the outer peripheral edge portion and the peripheral end of the circumferential curved portion of the front rim flange portion are located approximately at the same level as each other. In an alternative configuration, as shown for example in FIG. 7, an automobile wheel 71 may include a wheel disc 73 in which an outer peripheral edge portion 74 is formed to extend approximately perpendicularly to a center axis (not shown) so that the surface of the outer peripheral edge portion 74 is located backwardly of the peripheral end of the circumferential curved portion 19 of the front rim flange portion 11. This configuration is advantageous in that it is possible to attach a balance weight to the peripheral end of the circumferential curved portion 19. With the wheel disc 73 and the wheel rim 2 fitted with each other through the circumferential stepped fitting edge 32 and the circumferential stepped insertion edge 36, the respective center axes of the wheel disc 73 and the wheel rim 2 can be aligned with each other with high precision as in the first and second embodiments discussed above. The same constituent components as those in the first embodiment discussed above are denoted by the same reference numerals, and therefore are not described herein.

Figure 8:
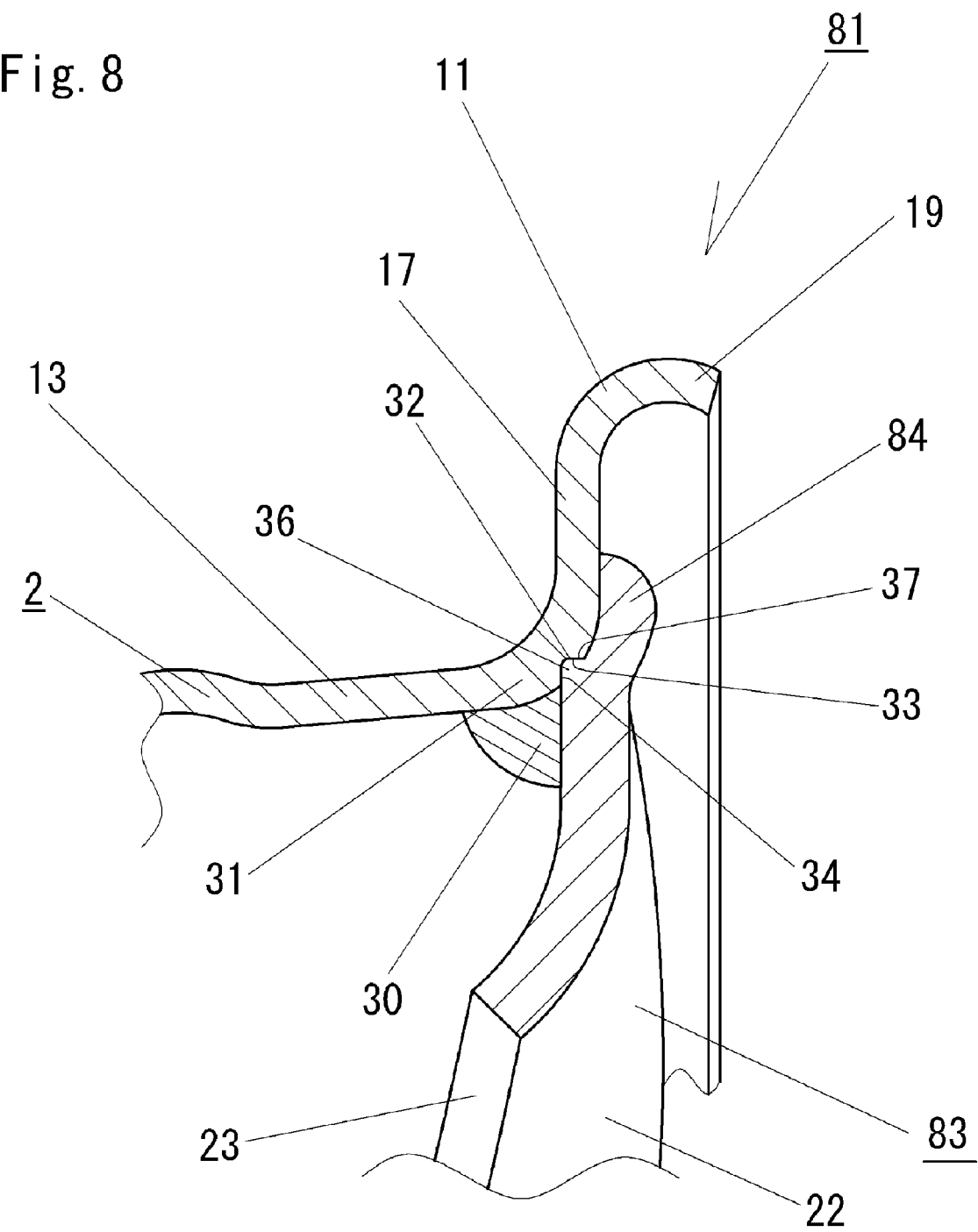
FIG. 8 is an enlarged cross-sectional view of an automobile wheel according to a further embodiment, showing the fitting state between a circumferential stepped fitting edge of the wheel rim and a circumferential stepped insertion edge of a wheel disc.

As an alternative to the configurations according to the first and second embodiments, as shown for example in FIG. 8, an automobile wheel 81 may include a wheel disc 83 in which an outer peripheral edge portion 84 is short in the radial length. In this configuration, the outer peripheral edge portion 84 is seated on a portion of the circumferential rising portion 17, which forms the front rim flange portion 11, that is located radially inwardly of the outermost peripheral end of the circumferential rising portion 17 (the base portion thereof) with the wheel disc 83 and the wheel rim 2 fitted with each other. This allows securing a wide design surface compared to the drop-fitting automobile wheels and the bead-fitting automobile wheels discussed above, improving the design quality. Also with this configuration, with the wheel disc 83 and the wheel rim 2 fitted with each other through the circumferential stepped fitting edge 32 and the circumferential stepped insertion edge 36, the respective center axes of the wheel disc 83 and the wheel rim 2 can be aligned with each other with high precision as in the first and second embodiments discussed above. The same constituent components as those in the first embodiment discussed above are denoted by the same reference numerals, and therefore are not described herein.

In the configurations according to the first and second embodiments discussed above, the circumferential stepped fitting edge is formed in the circumferential bent portion of the wheel rim, and the circumferential stepped insertion edge is formed on the outer peripheral edge portion of the wheel disc. In an alternative configuration, a circumferential positioning fitting groove which opens forwardly may be provided in the circumferential bent portion of the wheel rim, a circumferential insertion edge which projects backwardly may be formed on the outer peripheral edge portion of the wheel disc, and the circumferential insertion edge may be fitted inside the circumferential positioning fitting groove. This configuration also achieves the same effect as that achieved by the first and second embodiments discussed above.

In the configurations according to the first and second embodiments discussed above (and in the alternative configurations shown in FIGS. 7 and 8 and described above), a plurality of welded portions are formed at equal intervals in the circumferential direction. In an alternative configuration, the circumferential stepped fitting edge of the wheel rim and the circumferential stepped insertion edge of the wheel disc may be welded to each other over the entire circumference to form a welded portion.

The present invention is not limited to the embodiments and alternative configurations discussed above, and may be modified appropriately within the scope and spirit of the present invention. For example, the present invention may be applied to automobile wheels with the same configuration that are formed from an aluminum alloy or a magnesium alloy, achieving the same effect. The wheel disc and the wheel rim may be welded to each other through gas welding rather than arc welding described above.

DESCRIPTION OF REFERENCE NUMERALS 1, 51, 71, 81: automobile wheel
2: wheel rim
3, 53, 73, 83: wheel disc
11: front rim flange portion
12: back rim flange portion
13: front bead seat portion
14: back bead seat portion
17, 18: circumferential rising portion
19, 20: circumferential curved portion
21: hub mounting portion
24, 54, 74, 84: outer peripheral edge portion
31: circumferential bent portion
32: circumferential stepped fitting edge (circumferential positioning fitting groove)
33: fitting wall surface
36: circumferential stepped insertion edge (circumferential insertion edge)
37: insertion wall surface
54b: outer peripheral covering end portion
S1: center axis (center axis of wheel rim)
S2: center axis (center axis of wheel disc)

The invention claimed is:
1. An automobile wheel comprising:
a wheel rim including front and back bead seat portions that each support a bead of a tire and front and back rim flange portions each formed continuously with a corresponding one of the front and back bead seat portions so as to be bent radially outwardly; and
a wheel disc including a hub mounting portion to be coupled to an axle, the wheel disc and the wheel rim being welded to each other, wherein:
the wheel rim includes a circumferential positioning fitting groove formed circumferentially around a center axis of the wheel rim in a front surface of a circumferential bent portion at which the front bead seat portion and the front rim flange portion are formed continuously with each other, and is formed by a circumferential stepped fitting edge including a fitting wall surface formed circumferentially around the center axis of the wheel rim to extend axially toward a fitting wall face of the wheel rim, the wheel disc includes an annular outer peripheral edge portion extending radially outwardly and a circumferential insertion edge formed circumferentially around a center axis of the wheel disc on a back surface of the annular outer peripheral edge portion, the circumferential insertion edge is fitted in the circumferential positioning fitting groove from a front side, and is formed by a circumferential stepped insertion edge including an insertion wall surface formed circumferentially around the center axis of the wheel disc to extend axially from an insertion wall face of the wheel disc, the circumferential positioning fitting groove of the wheel rim and the circumferential insertion edge of the wheel disc are welded to each other from a back side with the circumferential positioning fitting groove and the circumferential insertion edge fitted with each other, the insertion wall surface is fitted in the fitting wall surface such that the fitting wall surface is farther from the center axis than the insertion wall surface, the front rim flange portion of the wheel rim includes a circumferential rising portion extending radially outwardly from the front bead seat portion and a circumferential curved portion curved axially forwardly from the circumferential rising portion, and an outer peripheral end of the outer peripheral edge portion of the wheel disk is in contact with and covered by an inner peripheral surface of the circumferential curved portion of the front rim flange portion of the wheel rim.

2. An automobile wheel comprising:

a wheel rim including front and back bead seat portions that each support a bead of a tire and front and back rim flange portions each formed continuously with a corresponding one of the front and back bead seat portions so as to be bent radially outwardly; and a wheel disc including a hub mounting portion to be coupled to an axle, the wheel disc and the wheel rim being welded to each other, wherein:

the wheel rim includes a circumferential positioning fitting groove formed circumferentially around a center axis of the wheel rim in a front surface of a circumferential bent portion at which the front bead seat portion and the front rim flange portion are formed continuously with each other, and is formed by a circumferential stepped fitting edge including a fitting wall surface formed circumferentially around the center axis of the wheel rim to extend axially toward a fitting wall face of the wheel rim, the wheel disc includes an annular outer peripheral edge portion extending radially outwardly and a circumferential insertion edge formed circumferentially around a center axis of the wheel disc on a back surface of the annular outer peripheral edge portion, the circumferential insertion edge is fitted in the circumferential positioning fitting groove from a front side, and is formed by a circumferential stepped insertion edge including an insertion wall surface formed circumferentially around the center axis of the wheel disc to extend axially from an insertion wall face of the wheel disc, the circumferential positioning fitting groove of the wheel rim and the circumferential insertion edge of the wheel disc are welded to each other from a back side with the circumferential positioning fitting groove and the circumferential insertion edge fitted with each other, the insertion wall surface is fitted in the fitting wall surface such that the fitting wall surface is farther from the center axis than the insertion wall surface, the front rim flange portion of the wheel rim includes a circumferential rising portion extending radially outwardly from the front bead seat portion and a circumferential curved portion curved axially forwardly from the circumferential rising portion; and an outer peripheral end of the outer peripheral edge portion of the wheel disc includes a step being in contact with a peripheral end and an inner peripheral surface of the circumferential curved portion of the front rim flange portion of the wheel rim from a front side.

3. The automobile wheel according to claim 1, wherein the inner peripheral surface of the circumferential curved portion of the front rim flange portion of the wheel rim has a same curvature as a backside surface of the outer peripheral edge portion, from the groove to an end of the circumferential curved portion of the front rim flange portion of the wheel rim.

\* \* \* \* \*